US012074425B2

United States Patent
Dabhole et al.

(10) Patent No.: US 12,074,425 B2
(45) Date of Patent: Aug. 27, 2024

(54) POWER SOURCE AND METHOD FOR PROVIDING AN ACTIVATING CURRENT

(71) Applicant: EATON INTELLIGENT POWER LIMITED, Dublin (IE)

(72) Inventors: Sagar Dabhole, Pune (IN); Roger Burkett, Swindon (GB); Varsha Sabale, Pune (IN); Prabhakar Patil, Pune (IN); Milan Paul, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 134 days.

(21) Appl. No.: 17/995,554

(22) PCT Filed: Apr. 9, 2021

(86) PCT No.: PCT/EP2021/059297
§ 371 (c)(1),
(2) Date: Oct. 5, 2022

(87) PCT Pub. No.: WO2021/204999
PCT Pub. Date: Oct. 14, 2021

(65) Prior Publication Data
US 2023/0155364 A1    May 18, 2023

(30) Foreign Application Priority Data

Apr. 10, 2020   (IN) .............................. 202011015695
Jun. 2, 2020    (GB) ..................................... 2008309

(51) Int. Cl.
*H01H 47/00*    (2006.01)
*H01H 9/54*     (2006.01)
(Continued)

(52) U.S. Cl.
CPC ................ *H02H 3/05* (2013.01); *H01H 9/54* (2013.01); *H01H 47/002* (2013.01); *B60L 3/04* (2013.01)

(58) Field of Classification Search
CPC ........... H01H 47/002; H01H 9/54; H02H 3/05
See application file for complete search history.

(56) References Cited

U.S. PATENT DOCUMENTS 8,151,707 B1    4/2012  Lasut
2012/0180682 A1*  7/2012  Rastegar ................. F42C 15/40
                                                    102/209

(Continued)

FOREIGN PATENT DOCUMENTS

DE   10 2012 214835 A1   2/2014
GB        2593943 A  * 10/2021   ................ B60L 3/04

(Continued)

*Primary Examiner* — Sisay G Tiku
(74) *Attorney, Agent, or Firm* — LEYDIG, VOIT & MAYER, LTD.

(57) ABSTRACT

A power source and method for providing an activating current a power source comprises an input terminal, a charging circuit having an input coupled to the input terminal of the power source, a capacitor having a first electrode coupled to an output of the charging circuit, an electronic switching circuit, a discharge protection circuit, a control switch and a disconnecting device. An input of the electronic switching circuit is coupled to the first electrode of the capacitor. The control switch includes a first terminal which is coupled via the discharge protection circuit to the input terminal of the power source and is coupled to an output of the electronic switching circuit. The disconnecting device comprises a first terminal coupled to a second terminal of the control switch.

14 Claims, 2 Drawing Sheets

Figure 1:
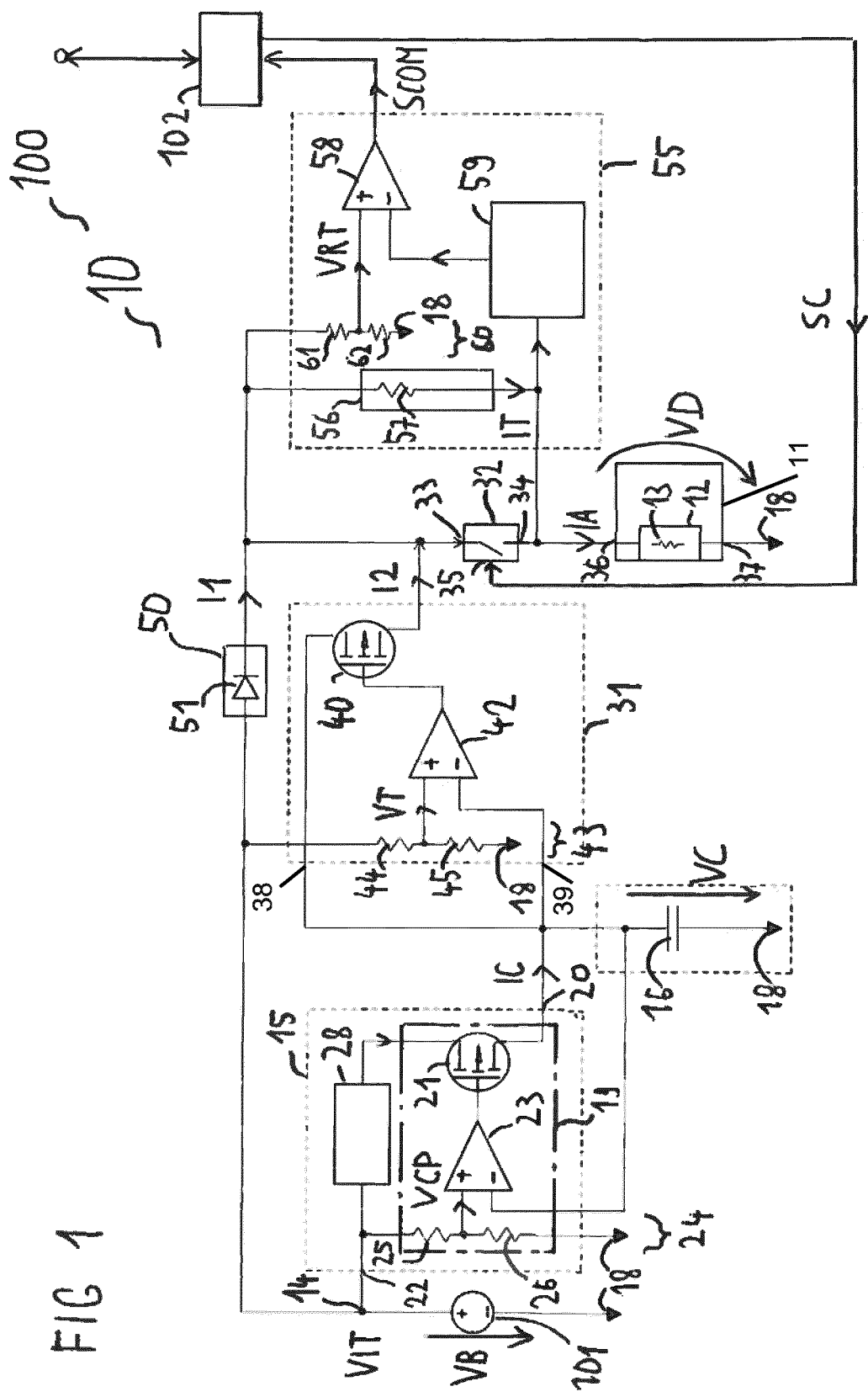

(51) Int. Cl.
*H02H 3/05* (2006.01)
*B60L 3/04* (2006.01)

(56) References Cited

U.S. PATENT DOCUMENTS

| | | | |
|---|---|---|---|
| 2013/0154352 A1 | 6/2013 | Tokarz et al. | |
| 2013/0174754 A1* | 7/2013 | Rastegar | F42C 11/00 |
| | | | 102/202.7 |
| 2013/0174756 A1* | 7/2013 | Rastegar | F42C 11/001 |
| | | | 102/215 |
| 2013/0180423 A1* | 7/2013 | Rastegar | F42C 11/00 |
| | | | 324/426 |
| 2014/0060366 A1* | 3/2014 | Rastegar | F42C 11/00 |
| | | | 102/206 |
| 2014/0202350 A1* | 7/2014 | Rastegar | F42C 11/02 |
| | | | 102/210 |
| 2015/0255975 A1 | 9/2015 | Siciak et al. | |
| 2015/0331008 A1* | 11/2015 | Rastegar | G01P 15/001 |
| | | | 73/514.34 |
| 2017/0133954 A1* | 5/2017 | Rastegar | C07D 207/325 |
| 2018/0123485 A1* | 5/2018 | Rastegar | F42C 11/02 |
| 2019/0003810 A1* | 1/2019 | Rastegar | F42C 11/008 |
| 2019/0063891 A1* | 2/2019 | Rastegar | H02N 2/181 |

FOREIGN PATENT DOCUMENTS

| | | | | |
|---|---|---|---|---|
| JP | 2016099082 A | * | 5/2016 | |
| WO | WO-2021204999 A1 | * | 10/2021 | B60L 3/04 |

* cited by examiner

POWER SOURCE AND METHOD FOR PROVIDING AN ACTIVATING CURRENT

The disclosure is related to a power source and a method for providing an activating current.

A power source may be implemented in an automotive application, for example in an electric or hybrid vehicle. An electric or hybrid vehicle typically comprises a high voltage battery and an electric motor which is coupled to the high voltage battery via a power switch and a connection line. In the case of an electric or hybrid vehicle being involved in an accident, the high voltage battery has to be safely disconnected from the motor and other electric parts without permitting an unintended reconnection. This can typically be achieved by a disconnecting device that is inserted in the connection line of the high voltage battery to the motor and to the other electric parts of the vehicle. Such a disconnecting device typically comprises a pyrotechnic ignition element which is activated using a power source. In case of an accident the power source should operate with high reliability.

It is an object to provide a power source and a method for providing an activating current to a disconnecting device with increased reliability.

The object is achieved by the subject-matter of the independent claims. Further embodiments and developments are described in the dependent claims.

In an embodiment, a power source comprises an input terminal, a charging circuit, a capacitor, an electronic switching circuit, a discharge protection circuit, a control switch and a disconnecting device. The charging circuit includes an input coupled to the input terminal. The capacitor has a first electrode coupled to an output of the charging circuit. An input of the electronic switching circuit is coupled to the first electrode of the capacitor. The control switch has a first terminal which is coupled via the discharge protection circuit to the input terminal of the power source and is coupled to an output of the electronic switching circuit. The disconnecting device includes a first terminal coupled to a second terminal of the control switch. The disconnecting device may comprise a pyrotechnic ignition element.

Advantageously, there are two sources of current which are configured to generate an activating current that is provided to the disconnecting device. First, the activating current can be provided from the input terminal of the power source via the discharge protection circuit and the control switch to the disconnecting device. Secondly, the activating current can be provided from the capacitor via the electronic switching circuit and the control switch to the disconnecting device. Since there are two alternative ways to provide the activating current, the reliability of the power source is increased. The activating current can also be called disconnecting current.

In an embodiment, the discharge protection circuit is configured such that a first current is able to flow from the input terminal of the power source via the discharge protection circuit to the first terminal of the control switch.

In an embodiment, the discharge protection circuit is configured such that no current or approximately no current is able to flow via the discharge protection circuit to the input terminal of the power source.

In an embodiment, the discharge protection circuit is configured such that an energy transfer from the output of the electronic switching circuit to the input terminal is prevented.

In an embodiment, the discharge protection circuit comprises a diode. An anode of the diode may be coupled to the input terminal and a cathode of the diode may be coupled to the first terminal of the control switch.

The capacitor may be implemented as supercapacitor.

In an embodiment, the charging circuit comprises a decision circuit with an input coupled to the input terminal and an output coupled to the first electrode of the capacitor.

In an embodiment, the decision circuit may be implemented as a regulator such as a low-dropout regulator.

In an embodiment, the decision circuit is configured to provide a charging current to the first electrode of the capacitor in case a capacitor voltage is lower than a reference voltage. The capacitor voltage drops between the first electrode of the capacitor and a reference potential terminal.

In an embodiment, the charging circuit comprises a voltage converter having an input coupled via the input of the charging circuit to the input terminal of the power source and an output coupled to an input of the decision circuit.

In an embodiment, the electronic switching circuit is configured to provide a second current to the first terminal of the control switch only in case a capacitor voltage VC that drops between the first electrode of the capacitor and the reference potential terminal follows the equation:

$$VC \geq k \cdot VIT$$

wherein VIT is a terminal voltage that is tapped between the input terminal of the power source and the reference potential terminal and k is a factor. Advantageously, the electronic switching circuit is triggered to generate the second current only in case the terminal voltage is too low.

In an embodiment, the electronic switching circuit comprises a voltage divider coupling the input terminal of the power source to the reference potential terminal, and a control comparator having a first input connected to a divider tap of the voltage divider and a second input connected to the first electrode of the capacitor via a further input of the electronic switching circuit. An output transistor of the electronic switching circuit includes a first terminal coupled to the first electrode of the capacitor via the input of the electronic switching circuit, a second terminal coupled to the first terminal of the control switch and a control terminal coupled to an output of the control comparator.

In an embodiment, the power source comprises a test circuit coupled to the disconnecting device.

In an embodiment, the test circuit is configured to apply a test current to the first terminal of the disconnecting device and to compare a test reference voltage with a device voltage or a voltage derived from the device voltage. The device voltage is tapped between the first terminal of the disconnecting device and the reference potential terminal.

In an embodiment, the test circuit comprises a source connected to the first terminal of the disconnecting device for providing a test current and a comparator having a first input that is coupled to the first terminal of the disconnecting device and a second input to which a reference voltage is provided. The source may be realized as current source or as voltage source.

In an embodiment, the test circuit comprises comprise an instrumentation amplifier coupling the first terminal of the disconnecting device to the first input of the comparator.

In an embodiment, an electric arrangement comprises the power source and a battery that is coupled to the input terminal. Moreover, the electric arrangement may comprise a battery management system having an output connected to the control terminal of the control switch.

In an embodiment, a method for providing an activating current comprises
- charging a capacitor by a charging circuit having an input coupled to an input terminal,
- setting a control switch in a conducting state, and
- providing the activating current alternatively either by providing a first current from the input terminal via an discharge protection circuit and a control switch to a disconnecting device or by providing a second current from the capacitor via an electronic switching circuit and the control switch to the disconnecting device.

In an embodiment, a control signal is provided to the control switch. The control signal sets the control signal in a conducting state in case of emergency. In normal operation, the control signal sets the control signal in a non-conducting state. Thus, the power source is controllable.

Features and embodiments that are only described in connection with the power source may also be implemented in connection with the method for providing an activating current and vice versa.

In an embodiment, the power source includes redundant power sources and diagnostics for a vehicle safety switch.

In an embodiment, the disconnecting device is realized as a pyro switch. The battery may be a conventional secondary low-voltage battery. Typically, the disconnecting device is triggered using the battery. Vehicle crash can abruptly disconnect this battery, so the disconnecting device cannot be triggered to isolate a high-voltage DC source from rest of the vehicle system. The power source described herewith aims to overcome this situation by providing a capacitor based redundant power source and a diagnostic system to monitor health of the disconnecting device. The power source results into a reliable, cost effective and compact solution for electric-vehicle applications, abbreviated as EV applications.

In an embodiment, a pyro switch is used in EV applications as disconnecting device because of its reliability and fast switching action, compared to other disconnecting devices or safety switches. However, it was observed in some cases that a vehicle crash leads to abrupt disconnection of the battery from the pyro switch ignitor. The battery may be a low-voltage battery, having e.g. a battery voltage of 12V. Due to this failure, an expected disconnection of the high-voltage battery, abbreviated HV battery, from the vehicle system fails which may lead to fire and explosion situations. The HV battery may have a voltage higher than 400 V. The power source described herewith proposes a capacitor based redundant power source, capable of igniting the pyro switch, when the primary power source i.e. the LV battery is not available.

In an embodiment, this capacitor based redundant power source is placed near to the pyro switch to avoid any such disconnection during crash condition. This capacitor can be provided as in-built part of pyro switch system or as in accessory so that a customer or an original equipment manufacturer (abbreviated OEM) has freedom to choose this redundant power source. The capacitor based power source is charged using primary LV battery having e.g. 12V. However, the power source does not replace the primary battery as a power source for the disconnecting device with the pyro ignitor unless the primary battery is unavailable. So primary LV battery always has first preference over capacitor based redundant power source. System may fail to isolate the HV battery in case of pyro ignitor failure due to unknown reasons even if power source is available (primary or redundant). To overcome this, the power source includes a pyro health diagnostic system with a resistance measurement which continuously monitors the health of pyro ignitor and generates prognostic feedback to a battery monitoring system (abbreviated BMS) or to an electronic control unit.

The following description of figures of embodiments shall further illustrate and explain aspects of the power source and method for providing an activating current. Parts and components with the same structure and the same effect, respectively, appear with equivalent reference symbols. Insofar as parts and components correspond to one another in terms of their function in different figures, the description thereof is not repeated for each of the following figures.

Figure 2:
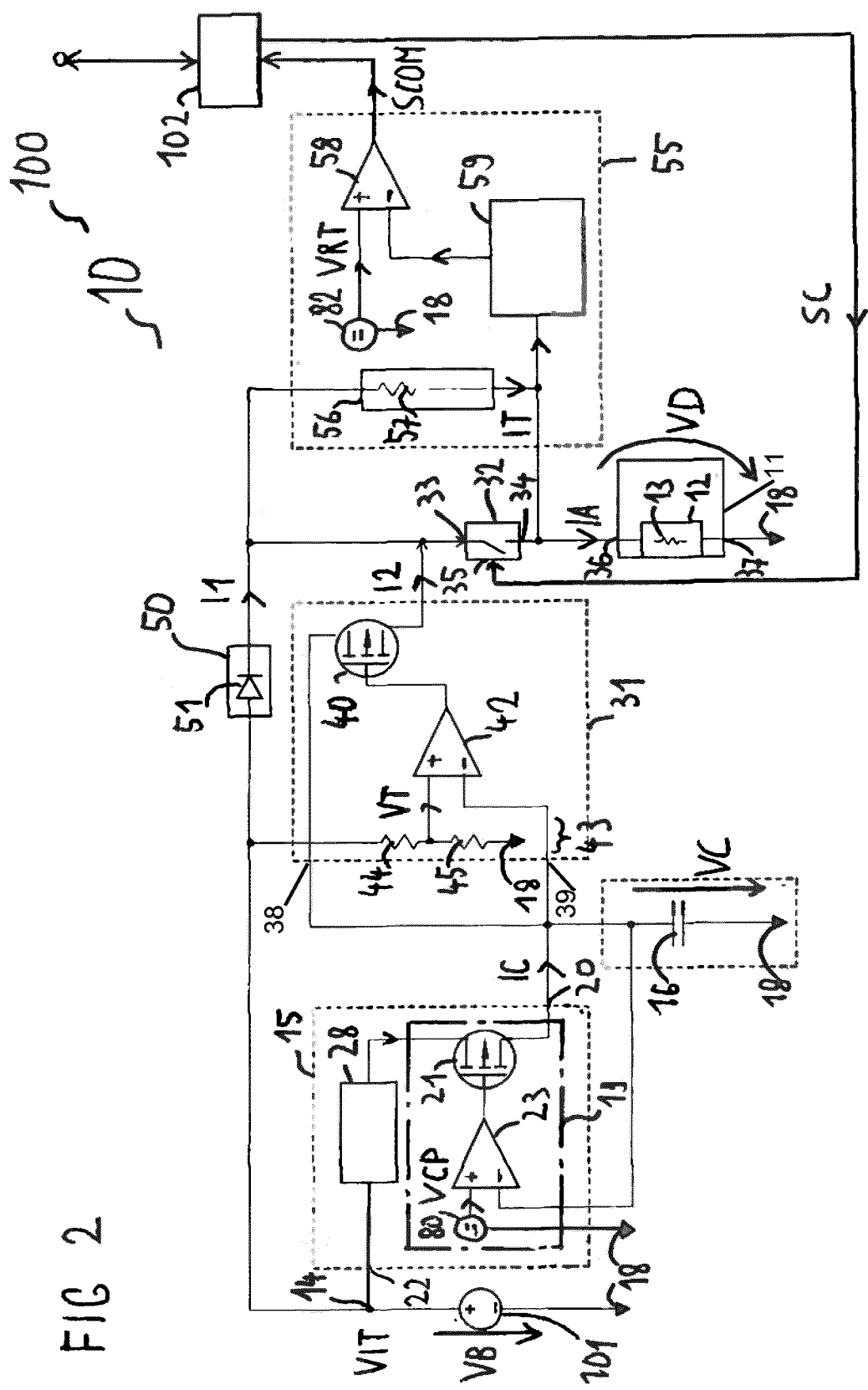

FIGS. 1 and 2 show exemplary embodiments of an electric arrangement with a power source.

FIG. 1 shows an exemplary embodiment of an electric arrangement 100 with a power source 10 which comprises a disconnecting device 11. The disconnecting device 11 comprises a pyrotechnic ignition element 12. The pyrotechnic ignition element 12 may comprise a resistor 13. The power source 10 comprises an input terminal 14, a charging circuit 15 and a capacitor 16. The input terminal 14 is coupled via the charging circuit 15 to a first electrode of the capacitor 16. A second electrode of the capacitor 16 is connected to a reference potential terminal 18. The capacitor 16 may be implemented as a supercapacitor. The charging circuit 15 comprises a decision circuit 19 that is connected on its output side via an output 20 of the charging circuit 15 to the first electrode of the capacitor 16.

The decision circuit 19 comprises a decision transistor 21. A first terminal of the decision transistor 21 is coupled via a voltage converter 28 of the charging circuit 15 and an input 22 of the charging circuit 15 to the input terminal 14. A second terminal of the decision transistor 21 is connected via the output 20 of the charging circuit 15 to the first electrode of the capacitor 16. Moreover, the decision circuit 19 comprises a decision comparator 23 having an output connected to a control terminal of the decision transistor 21. A first input of the decision comparator 23 is coupled via the input 22 of the charging circuit 15 to the input terminal 14. A second input of the decision comparator 23 is connected to the first electrode of the capacitor 16. The decision circuit 19 comprises a decision voltage divider 24 having a divider tap that is connected to the first input of the decision comparator 23. The decision voltage divider 24 comprises a first and a second divider resistor 25, 26 that are connected in series between the input 22 of the charging circuit 15 and the reference potential terminal 18. The divider tap is between the first and the second divider resistor 25, 26.

Additionally, the voltage converter 28 includes an input coupled via the input 22 of the charging circuit 15 to the input terminal 14 and an output connected to the first terminal of the decision transistor 21. The voltage converter 28 is optional and may be replaced e.g. by a connection line, a resistor or a low-pass filter.

Furthermore, the power source 10 comprises an electronic switching circuit 31 that is coupled on its input side to the first electrode of the capacitor 16. An input 38 and a further input 39 of the electronic switching circuit 31 are coupled to the first electrode of the capacitor 16. The input 38 and the further input 39 of the electronic switching circuit 31 may be connected to each other.

Moreover, the power source 10 comprises a control switch 32. The control switch 32 has a first and a second terminal 33, 34 and a control terminal 35. The second terminal 34 of the control switch 32 is coupled to a first terminal 36 of the disconnecting device 11. A second terminal 37 of the disconnecting device 11 is coupled or connected to the reference potential terminal 18. The electronic switching circuit 31 is coupled on its output side to the first terminal 33 of the control switch 35. The electronic switching circuit 31 comprises an output transistor 40 having a first terminal that is connected to the first electrode of the capacitor 16 via the input 38 of the electronic switching circuit 31. A second terminal of the output transistor 40 is connected to the first terminal 33 of the control switch 32.

The electronic switching circuit 31 comprises a control comparator 42 having an output connected to a control terminal of the output transistor 40. A first input of the control comparator 42 is coupled to the input terminal 14. A second input of the control comparator 42 is connected to the first electrode of the capacitor 16 via the further input 39 of the electronic switching circuit 31. The electronic switching circuit 31 comprises a voltage divider 43 that couples the input terminal 14 to the reference potential terminal 18. A divider tap of the voltage divider 43 is connected to the first input of the control comparator 42. The voltage divider 43 of the electronic switching circuit 31 comprises a first and a second divider resistor 44, 45 which are arranged in series between the input terminal 14 and the reference potential terminal 18. The divider tap of the voltage divider 43 is arranged between the first and the second divider resistor 44, 45.

Furthermore, the power source 10 comprises a discharge protection circuit 50 that couples the input terminal 14 to the first input 33 of the control switch 32. The discharge protection circuit 50 may be called "reverse discharge protection circuit". The discharge protection circuit 50 is configured to allow a current flow in one direction only. The discharge protection circuit 50 comprises a diode 51. For example, an anode of the diode 51 is connected to the input terminal 14 and a cathode of the diode 51 is connected to the first terminal 33 of the control switch 32.

Additionally, the power source 10 comprises a test circuit 55 that is coupled to the disconnecting device 11. A terminal of the test circuit 55 is connected to the first terminal 36 of the disconnecting device 11. The test circuit 55 comprises a source 56 having an output connected to the first terminal 36 of the disconnecting device 11. An input of the source 56 may be coupled to the input terminal 14. The input of the source 56 is coupled e.g. via the discharge protection circuit 50 to the input terminal 14. The source 56 may comprise a source resistor 57. The source resistor 57 couples the input terminal 14 to the first terminal 36 of the disconnecting device 11. The source 56 may be a current source.

Moreover, the test circuit 55 comprises a comparator 58 having a first and a second input. The second input of the comparator 58 is coupled to the first terminal 36 of the disconnecting device 11. The test circuit 55 may comprise a test amplifier 59. The test amplifier 59 has an input connected to the first terminal 36 of the disconnecting device 11. An output of the test amplifier 59 is connected to the second input of the comparator 58. The test amplifier 59 is a voltage amplifier. The test amplifier 59 may be realized as an instrumentation amplifier.

Furthermore, the test circuit 55 comprises a test voltage divider 60. A divider tap of the test voltage divider 60 is connected to the first input of the comparator 58. The test voltage divider 60 couples the input terminal 14 to the reference potential terminal 18. The test voltage divider 60 comprises a first and a second divider resistor 61, 62. The first and the second divider resistor 61, 62 are connected in series between the input terminal 14 and the reference potential terminal 18. The divider tap is arranged between the first and the second divider resistor 61, 62.

The power source 10 is part of the electric arrangement 100. The electric arrangement 100 comprises the power source 10 and a battery 101. The battery 101 is coupled to the input terminal 14. Thus, the battery 101 couples the input terminal 14 to the reference potential terminal 18. Moreover, the electric arrangement 100 comprises a battery management system 102, abbreviated BMS. An output of the BMS 102 is connected to the control terminal 35 of the control switch 32. An input of the BMS 102 is connected to an output of the test circuit, more specifically to an output of the comparator 58.

A battery voltage VB is provided by the battery 101. A terminal voltage VIT is tapped at the input terminal 14. The terminal voltage VIT is equal to the battery voltage VB as long as there is no failure, such as e.g. a missing connection of the battery 101 to the input terminal 14. The battery voltage VB can be tapped between the input terminal 14 and the reference potential terminal 18. A capacitor voltage VC can be tapped between the first and the second electrode of the capacitor 16. The charging circuit 15 provides a charging current IC. A first current I1 flows through the discharge protection circuit 50. A second current I2 is provided by the electronic switching circuit 31. An activating current IA is provided to the first terminal 36 of the disconnecting device 11. The activating current IA flows through the disconnecting device 11 to the reference potential terminal 18. A control signal SC is applied to the control terminal 35 of the control switch 32. The control signal SC is generated by the BMS 102. A test current IT flows through the source 56. A device voltage VD is tapped between the first terminal 36 of the disconnecting device 11 and the reference potential terminal 18. The comparator 58 generates a comparator signal SCOM. The generator signal SCOM is provided to the BMS 102.

At the start of operation, the battery voltage VB is provided to the input terminal 14, for example by a switch (not shown) between the battery 101 and the input terminal 14. In the case that the battery voltage VB can be tapped at the input terminal 14, the charging circuit 15 applies the charging current IC to the capacitor 16. Thus, the capacitor voltage VC rises from a value of 0 V. The capacitor voltage VC rises up to a reference voltage VCP. The reference voltage VCP is applied to the first input of decision comparator 23. The reference voltage VCP may be a predetermined reference voltage. The reference voltage VCP may be determined by the decision voltage divider 24 and the battery voltage VB. The reference voltage VCP can be tapped at the divider tap of the decision voltage divider 24. In the case that the capacitor voltage VC reaches the reference voltage VCP, the charging current IC is zero or is approximately zero.

The voltage converter 28 provides a down conversion. The voltage converter 28 is implemented as Buck converter or Buck-Boost converter. Thus, the voltage converter 28 is realized as a direct-current to direct-current converter, abbreviated as DC-to-DC converter. The voltage converter 28 may be realized as a capacitive converter or an inductive converter. A voltage at the output of the voltage converter 28 may be less than the battery voltage VB.

At normal operation of the electric arrangement 100 or of a vehicle comprising the electric arrangement 100, the control signal SC sets the control switch 32 in a non-conducting state. Thus, the disconnecting device 11 is not triggered. The activation current IA only has the value of the test current IT; thus, the activation current IA does not activate the disconnecting device 11.

An emergency operation of the electric arrangement 100 is different from the normal operation of the electric arrangement 100. The emergency operation may e.g. occur in the case of an accident of the vehicle.

At the emergency operation, the control signal SC sets the control switch 32 in a conducting state. The BMS 102 generates the control signal SC with a triggering value e.g. in case of an accident. The power source 10 achieves that the activating current IA immediately obtains a value that triggers the disconnecting device 11. In the case of triggering of the disconnecting device 11 the pyrotechnic ignition element 12 is activated and interrupts a power connection line (not shown) between a high voltage battery and a motor or other electric parts of the vehicle (not shown). The activating current IA either results from the first current I1 or results from the second current I2. A value IA of the activating current can be calculated as follows:

$$IA = I1 + I2 + IT,$$

wherein I1 is a value of the first current, I2 is a value of the second current and IT is a value of the test current. In case the test current IT can be neglected, the value IA of the activating current can be calculated as follows:

$$IA = I1 + I2$$

In the emergency operation with regular operation of the power source 10, the activating current IA has the value of the first current I1. Thus, in the emergency operation with regular operation of the power source 10, the battery 101 generates the first current I1. The first current I1 flows from the input terminal 14 via the discharge protection circuit 50 and the control switch 32 to the disconnecting device 11.

In the emergency operation, a failure of the battery 101 or of a connection line between the battery 101 and the input terminal 14 may occur resulting in an alternative operation of the power source 10. In the emergency operation with alternative operation of the power source 10, the first current I1 has a small value, e.g. zero or approximately zero, and the activating current IA approximately or exactly has the value of the second current I2.

The electronic switching circuit 31 is configured to detect whether the terminal voltage VIT is sufficient for generating the first current I1. The electronic switching circuit 31 compares a voltage derived from the terminal voltage VIT with the capacitor voltage VC. The terminal voltage VIT generates a threshold voltage VT at the divider tap of the voltage divider 43 of the electronic switching circuit 31. The control comparator 42 compares the threshold voltage VT with the capacitor voltage VC. In the case that the threshold voltage VT is less than the capacitor voltage VC, the control comparator 42 sets the output transistor 40 into a conducting state. Thus, the second current I2 flows from the first electrode of the capacitor 16 via the output transistor 40 and the control switch 32 to the disconnecting device 11. In the case that the threshold voltage VT is higher than the capacitor voltage VC, the control comparator 42 sets the output transistor 40 into a non-conducting state; thus, the second current I2 has approximately or exactly the value zero.

Thus, the second current I2 is only generated with a value sufficient to trigger the disconnecting device 11 in the case that the first current I1 is zero or is too low. The capacitor voltage VC is only used to generate the activating current IA in the case that a terminal voltage VIT tapped at the input terminal 14 is too low. Thus, either the terminal voltage VIT or the capacitor voltage VC is used to generate the activating current IA. Alternatively, the activating current IA mainly results from the second current I2 and results only to a small extent from the first current I1 (e.g. in case of a partial failure of the battery 101 or of connection lines of the battery 101). Advantageously, a high reliability of the power source 10 is achieved.

In the case that the control switch 32 is set in a non-conducting state, the test current IT generates a value of the device voltage VD that mainly depends on the resistance value of the resistor 13 of the pyrotechnic ignition element 12. A value of the device voltage VD follows the equation:

$$VD = IT \cdot R,$$

wherein R is a resistance value of the resistor of the pyrotechnic ignition element 13 and IT is a value of the test current. The device voltage VD or a voltage derived from the device voltage VD is provided to the second input of the comparator 58. A test reference voltage VRT is provided to the first input of the comparator 58. The test reference voltage VRT is generated by the test voltage divider 60. The test amplifier 59 may amplify the device voltage VD and generate the voltage that is applied to the second input of the comparator 58.

Thus, the comparator 58 compares the device voltage VD or a voltage depending on the device voltage VD with the test reference voltage VRT. The test reference voltage VRT may have a predetermined value. The comparator 58 generates a comparator signal SCOM indicating whether the device voltage VD is lower or higher than the test reference voltage VRT. In the case that the device voltage VD is lower than the test reference voltage VRT, the comparator signal SCOM indicates a failure inside the disconnecting device 11, such as, for example, resulting from a short circuit inside the disconnecting device 11.

In an alternative embodiment, the test circuit 55 may comprise a further comparator. The comparator 58 and the further comparator form a window comparator for comparing the device voltage VD or a voltage depending on the device voltage VD with the test reference voltage VRT and a further test reference voltage. The disconnecting device 11 has a failure in case the device voltage VD or a voltage depending on the device voltage VD is outside of a voltage region that is between the test reference voltage VRT and the further test reference voltage.

In FIG. 1, the battery 101 is implemented as a conventional LV battery source. The disconnecting device 11 may be realized as a pyro ignitor. The ignition is controlled via the control signal SC generated by the BMS 102 and provided to the control switch 32. In event of vehicle crash and the battery 101 being not disconnected, the battery 101 provides the required activating current IA to the pyro ignitor element 12 via the discharge protection circuit 50 and the control switch 32. The activating current IA can be named ignition current. The capacitor 16 is fabricated as a supercapacitor. The capacitor 16 acts as redundant power source. Charging of the capacitor 16 is done using the charging circuit 15. The charging circuit 15 starts charging the capacitor 16, when the LV battery 101 is first connected in or to the power source 10. After a first charging cycle of the capacitor 16, the capacitor 16 always remains charged and acts as the redundant power source for the pyrotechnic ignition element 12. In the event of vehicle crash when LV battery 101 abruptly disconnects, the electronic switching circuit 31 detects this situation and connects the redundant power source (supercapacitor 16) to the pyrotechnic ignition element 12 via the control switch 32. The pyrotechnic ignition element 12 may be named pyro ignitor element.

The discharge protection circuit 50 prevents a reverse current flow from the capacitor 16 to other battery connected accessories or devices. Thus, the discharge protection circuit 50 realizes a reverse discharge protection circuit.

The test circuit 55 may be named health monitoring section of the diagram. The source 56 connected to the battery 101 ensures to pass a minimum test current IT through the pyro ignitor element 12. This test current IT is sufficient enough to check the continuity (via resistance measurement) of the resistor 13 that realizes a pyro ignitor filament. The device voltage VD generated across the pyro ignitor filament is amplified using the test amplifier 59 implemented as instrumentation amplifier. The comparator 58 compares this voltage with the test reference voltage VRT to verify the filament health and generates a comparator signal SCOM for the BMS 102 and/or an electronic circuit unit. With these two circuits, i.e. redundant power source and health monitoring system 55, the disconnecting device 11 is made more reliable and robust.

The power source 10 may use only discrete electronic components to make it compact and achieve a cost effective solution. Alternatively, parts of the power source 10 may be realized as an integrated circuit. For example, the charging circuit 15, the electronic switching circuit 31, the discharge protection circuit 50, the control switch 32 and the test circuit 55 may be integrated on one or several integrated circuits. Furthermore, the power source 10 may be designed as in-built part of the pyro switch itself or as an additional accessory.

Alternatively, the source 56 is realized as voltage source.

In an alternative embodiment, not shown, the discharge protection circuit 50 comprises a switch. Thus, the diode 51 is replaced by the switch. The switch is controlled by the signal at the output of the control comparator 42. The switch is set in a conducting state by said signal in case the output transistor 40 is set in a non-conducting state and vice versa.

In an alternative embodiment, not shown, the disconnecting device 11 is coupled via a current sink (e.g. a resistor) to the reference potential terminal 18.

FIG. 2 shows a further exemplary embodiment of an electric arrangement 100 with a power source 10 which is a further development of the embodiment shown in FIG. 1. The charging circuit 15 comprises a reference voltage source 80 that is connected to the first terminal of the decision comparator 23. The reference voltage source 80 replaces the decision voltage divider 24 shown in FIG. 1. Thus, the reference voltage source 80 generates the reference voltage VCP. The charging current IC flows in case the capacitor voltage VC is less than the reference voltage VCP. Advantageously, after first charging of the capacitor 16, the capacitor voltage VC has a value independent from the value of the battery voltage VB.

The test circuit 55 comprises a reference voltage generator 82. The reference voltage generator 82 replaces the test voltage divider 60 shown in FIG. 1. Thus, the test reference voltage VRT is generated by the reference voltage generator 82. Advantageously, the comparison of the device voltage VD with the test reference voltage VRT is independent from the value of the battery voltage VB.

The source 56 may be configured to provide the test current IT independent from the value of the battery voltage VB. For example, the source 56 may be supplied by the reference voltage generator 82.

The battery 101 is a low voltage battery of the electric arrangement 100. Alternatively, the battery 101 may be a high voltage battery, e.g. the high voltage battery of the vehicle. A down converter of the electric arrangement 100 may couple the battery 101 to the input terminal 14.

The decision comparator 23 and the control comparator 42 are implemented as comparators. The decision transistor 21 and the output transistor 40 are fabricated as transistors, for example as field-effect transistors such as e.g. metal-oxide-semiconductor field-effect transistors. The control switch 32 may be fabricated as electronic switch, for example as transistor (e.g. as field-effect transistor such as e.g. metal-oxide-semiconductor field-effect transistor), thyristor or silicon controlled rectifier.

The embodiments shown in FIGS. 1 and 2 as stated represent example embodiments of the power source and method for providing an activating current; therefore, they do not constitute a complete list of all embodiments according to the improved power source and method. Actual power sources may vary from the embodiments shown in terms of parts, structures and shape, for example.

REFERENCE NUMERALS 10 power source
11 disconnecting device
12 pyrotechnic ignition element
13 resistor
14 input terminal
15 charging circuit
16 capacitor
18 reference potential terminal
19 decision circuit
20 output
21 decision transistor
22 input
23 decision comparator
24 decision voltage divider
25, 26 divider resistor
28 voltage converter
31 electronic switching circuit
32 control switch
33 first terminal
34 second terminal
35 control terminal
36 first terminal
37 second terminal
38, 39 input
40 output transistor
42 control comparator
43 voltage divider
44, 45 divider resistor
50 discharge protection circuit
51 diode
55 test circuit
56 source
57 source resistor
58 comparator
59 test amplifier
60 test voltage divider
61, 62 divider resistor
80 reference voltage source
82 reference voltage generator
100 electric arrangement
101 battery
102 battery management system
IA activating current
IC charging current
IT test current
I1 first current
I2 second current
VB battery voltage VC capacitor voltage
VCP reference voltage
VD device voltage
VIT terminal voltage
VRT test reference voltage
VT threshold voltage
SC control signal
SCOM comparator signal

The invention claimed is:

1. A power source, comprising
an input terminal,
a charging circuit having an input coupled to the input terminal of the power source,
a capacitor having a first electrode coupled to an output of the charging circuit,
an electronic switching circuit, wherein an input of the electronic switching circuit is coupled to the first electrode of the capacitor,
a discharge protection circuit,
a control switch having a first terminal which is coupled via the discharge protection circuit to the input terminal of the power source and is coupled to an output of the electronic switching circuit, and
a disconnecting device with a first terminal coupled to a second terminal) of the control switch and comprising a pyrotechnic ignition element.

2. The power source according to claim 1, wherein the discharge protection circuit is configured such that a first current is able to flow from the input terminal of the power source via the discharge protection circuit to the first terminal of the control switch and an energy transfer from the output of the electronic switching circuit to the input terminal of the power source is prevented.

3. The power source according to claim 1, wherein the discharge protection circuit comprises a diode.

4. The power source according to claim 1, wherein the charging circuit comprises a decision circuit with an input coupled to the input terminal of the power source and an output coupled to the first electrode of the capacitor.

5. The power source according to claim 4, wherein the decision circuit is configured to provide a charging current to the first electrode of the capacitor in case a capacitor voltage that drops between the first electrode of the capacitor and a reference potential terminal is lower than a reference voltage.

6. The power source according to claim 5, wherein the charging circuit comprises a voltage converter having an input coupled to the input terminal of the power source and an output coupled to the input of the decision circuit.

7. The power source according to claim 1, wherein the electronic switching circuit is configured to provide a second current to the first terminal of the control switch only in case a capacitor voltage VC that drops between the first electrode of the capacitor and a reference potential terminal follows the equation:

$$VC \geq k \cdot VIT$$

wherein VIT is a terminal voltage that is tapped between the input terminal of the power source and the reference potential terminal and k is a factor.

8. The power source according to claim 1, wherein the electronic switching circuit comprises
a voltage divider coupling the input terminal of the power source to a reference potential terminal,
a control comparator having a first input connected to a divider tap of the voltage divider and a second input connected to the first electrode of the capacitor via a further input of the electronic switching circuit, and
an output transistor having a first terminal coupled to the first electrode of the capacitor via the input of the electronic switching circuit, a second terminal coupled to the first terminal of the control switch and a control terminal coupled to an output of the control comparator.

9. The power source according to claim 1, wherein the power source comprises a test circuit coupled to the disconnecting device.

10. The power source according to claim 9, wherein the test circuit is configured to apply a test current to the first terminal of the disconnecting device and to compare a test reference voltage with a device voltage or a voltage derived from the device voltage, and wherein the device voltage is tapped between the first terminal of the disconnecting device and a reference potential terminal.

11. The power source according to claim 9, wherein the test circuit comprises
a source connected to the first terminal of the disconnecting device for providing a test current, and
a comparator having a first input that is coupled to the first terminal of the disconnecting device and a second input to which a test reference voltage is provided.

12. The power source according to claim 1, wherein the capacitor is realized as super capacitor.

13. An electric arrangement, comprising
the power source according to claim 1; and,
a battery that is coupled to the input terminal.

14. A method for providing an activating current, comprising
charging a capacitor with a charging current generated by a charging circuit having an input coupled to an input terminal,
setting a control switch in a conducting state, and
providing the activating current alternatively either by providing a first current from the input terminal via a discharge protection circuit and a control switch to a disconnecting device or by providing a second current from the capacitor via an electronic switching circuit and the control switch to the disconnecting device.

* * * * *